United States Patent [19]

Estes

[11] Patent Number: 4,586,533

[45] Date of Patent: May 6, 1986

[54] NON-FLOWING MODULATING PILOT OPERATED RELIEF VALVE

[75] Inventor: Robert F. Estes, Foxboro, Mass.

[73] Assignee: Crosby Valve & Gage Company, Wrentham, Mass.

[21] Appl. No.: 750,895

[22] Filed: Jul. 1, 1985

[51] Int. Cl.⁴ ............................................ F16K 31/122
[52] U.S. Cl. .................................... 137/488; 137/116.3
[58] Field of Search ...................... 137/488, 492, 492.5, 137/116.3, 102

[56] References Cited

U.S. PATENT DOCUMENTS

| | | | |
|---|---|---|---|
| 2,477,247 | 7/1949 | Haberland | 137/53 |
| 2,504,720 | 4/1950 | Nixon | 50/23 |
| 2,571,154 | 10/1951 | Mercier | 137/53 |
| 2,609,832 | 9/1952 | Smith | 137/489 |
| 2,619,109 | 11/1952 | Garrett et al. | 137/488 |
| 2,649,115 | 8/1953 | Deardorff | 137/656 |
| 2,661,023 | 12/1953 | Griswold | 137/688 |
| 2,877,791 | 3/1959 | Kich | 137/488 X |
| 3,010,691 | 11/1961 | Canfield | 251/30 |
| 3,211,174 | 10/1965 | Weise et al. | 137/469 |
| 3,221,765 | 12/1965 | Farris | 137/492 |
| 3,294,111 | 12/1966 | Abercrombie et al. | 137/488 |
| 3,304,951 | 2/1967 | Farris | 137/492 |
| 3,406,712 | 10/1968 | Weise | 137/470 |
| 3,414,008 | 12/1968 | Greenwood | 137/492 |
| 3,419,030 | 12/1968 | Gratzmuller | 137/102 |
| 3,512,560 | 5/1970 | Weise | 137/102 |
| 3,568,706 | 3/1971 | Weise | 137/112 |
| 3,664,362 | 5/1972 | Weise | 137/488 X |
| 3,726,301 | 4/1973 | Schmidt | 137/102 |
| 3,771,553 | 11/1973 | Huet | 137/488 |
| 4,384,590 | 5/1983 | Friend | 137/102 |

OTHER PUBLICATIONS

Brochure, GPE Controls, "Series 94650 Non-Flowing Modulating Pilot Operated Pressure Relief Valve" (1984), 7 pages.

Brochure, Sebim, "Pilot Operated Safety Relief Valve" (1980 or later), 6 pages.

Brochure, Teledyne Farris Engineering Catalog FE-1111, "Soft Seated Pilot Operated Safety & Relief Valves for Gas or Liquid Service" (1972), 12 pages.

Primary Examiner—Alan Cohan
Attorney, Agent, or Firm—Kenway & Jenney

[57] ABSTRACT

A pilot operated pressure relief valve system having a modulating action. The pilot valve is of the non-flowing type and comprises sleeve and control stem members translating within a channel. The sleeve member comprises an exhaust valve for relieving dome pressure on the relief valve when lifted by the control stem. The control stem translates in response to system pressure changes and comprises an inlet valve cooperating with a seat on the sleeve member to form an inlet valve closable to isolate the dome from the system pressure when the latter reaches a level predetermined in relation to a set pressure.

6 Claims, 2 Drawing Figures

NON-FLOWING MODULATING PILOT OPERATED RELIEF VALVE

SUMMARY OF THE INVENTION

This invention relates generally to fluid pressure relief valves of the type operated by a pilot valve that does not conduct system fluid when the main relief valve is fully open and flowing. Pilot valves of this type have demonstrated superior reliability during blowdown when the relief valve is being returned to its closed position, because the pilot valve is not influenced by flowing fluid which may cause icing or other conditions that are unrelated to the controlling system pressure.

It has been common practice to use so-called "snap-acting" pilot operated relief valves. With these valves, when the system pressure reaches a set value the pilot valve cracks open and immediately lifts to a fully open position, thereby causing the relief valve also to move immediately to a fully open position. In certain conditions this may cause an excessive discharge of system fluid, that is, discharge of a greater volume of system fluid than that required to reduce the system pressure below the set value. It is an object of this invention to provide improvements whereby the relief valve does not snap open and closed, but rather opens only by an amount that is proportional to, or increases with, the magnitude of the overpressure, that is, the extent by which the system pressure exceeds the set value.

A second object of the invention is to achieve the foregoing improvements by means of a novel pilot valve.

A third object of the invention is to provide a pilot valve wherein there is no fluid flow through the pilot either when the main valve is fully open and flowing or at system pressures below the set value.

A fourth object of the invention is to provide a pilot valve with the foregoing improvements and also having a capability for field testing.

A fifth object of the invention is to provide an improved pilot valve having a minimum number of moving parts and wherein the structure is simplified and reliable in operation.

With the foregoing and other objects in view, the features of this invention comprise a novel pilot valve for use with a relief valve of the type having a dome adapted to cause a pressure therein to apply a closing force to the relief valve disc. With such relief valves it is common to provide a pilot valve adapted to permit system pressure to be applied to the dome to hold the relief valve closed when the system pressure is below the set value. Usually, a compression spring is provided to assist in holding the relief valve closed. In any case, when the system pressure rises above the set value the pilot valve is usually adapted to disconnect the dome from the system pressure and to allow the dome pressure to be exhausted, allowing the relief valve to open. It is a feature of this invention that the improved pilot valve has a modulating characteristic, that is, it causes the relief valve to open only to an extent increasing with, or proportional to, the magnitude of the overpressure.

The improved pilot valve has only two movable components namely, sleeve and control stem members located within a channel formed in the pilot valve body. Axial movement of the control stem is continually controlled by the system pressure by a connection through a sense line to the system pressure upstream of the relief valve disc. The sleeve is movable axially by means of the control stem and forms an exhaust valve disc. This disc is adapted to be closed against an exhaust seat to isolate the relief valve dome from an exhaust port, or to be raised variable amounts from the exhaust seat for variable control of the rate of discharge of the dome pressure through the exhaust port.

According to another feature, the control stem and sleeve respectively form an inlet valve disc and inlet seat, which together comprise an inlet valve through which system pressure is communicated to the dome at pressures below the set value. However, at pressures below the set value the fluid flow through the inlet valve ceases once the dome pressure has been equalized to the system pressure. The inlet valve closes at a predetermined pressure slightly below the set value, thereby isolating the dome from the system pressure and preventing any further flow through the inlet valve while the system pressure is above the predetermined pressure.

According to another feature, after the system pressure has risen to the set value, the control stem begins to lift the sleeve, thereby allowing the dome pressure to begin to escape through the exhaust port. The rate at which the dome pressure is exhausted is a function of the magnitude of the overpressure. For small values of overpressure the dome pressure is relieved gradually, with the result that the relief valve disc rises only a small distance from its seat, the system pressure being thereby only gradually relieved. On the other hand, if the overpressure is greater, the sleeve is lifted a greater distance, the dome pressure is more rapidly exhausted and the relief valve disc rises further from its seat.

The foregoing and other features of this invention will be more readily understood from the following description of a preferred embodiment of the invention.

DRAWING

DETAILED DESCRIPTION

Figure 2:
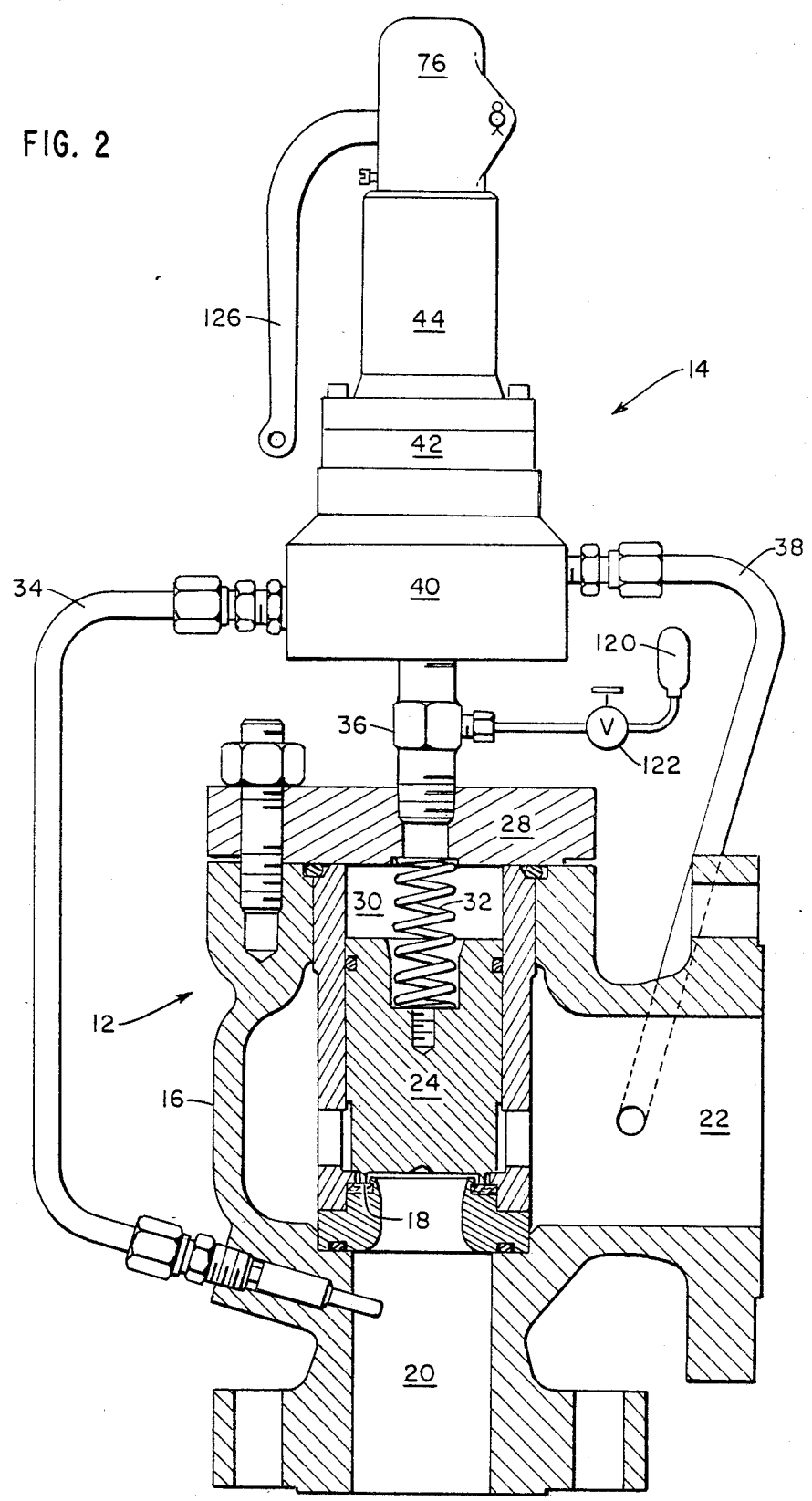
FIG. 2 is an elevation partially in section of the pilot valve connected with a relief valve to form a pressure relief valve system.

Referring to FIG. 2, the complete system comprises a relief valve designated generally at 12 and a pilot valve designated generally at 14. The relief valve is a conventional construction and comprises a body 16 having a seat 18 communicating between an inlet 20 and an outlet 22, a relief valve disc 24 closable on the seat, and a cover 28 attached to the body and forming a dome 30 above the disc 24, whereby pressure in the dome applies a force to the disc in a direction for closing it upon the seat 18. A compression spring 32 applies a force similarly tending to close the valve. The effective area of the disc within the dome may be greater than the effective area of the seat 18, as shown. The inlet 20 is connected with the pressurized fluid system to be controlled by the relief valve.

It will be understood from the following description that the particular construction of the relief valve 12 as shown is merely for purposes of illustration, and that other forms of relief valves may be substituted in combination with the pilot valve 14 for particular applications.

The relief valve and pilot valve are interconnected by three lines, namely, a sense line 34, a dome line 36 and a pilot exhaust line 38. Under all conditions the sense line 34 is at the system pressure, the dome line 36 is at the dome pressure, and the pilot exhaust line 38 is connected with the outlet 22 downstream of the relief valve seat 18 or with some other suitable connection that is at a low or atmospheric pressure.

In operation, when the system pressure is below a value for which the pilot valve is set, system fluid communicates with the dome 30 through the sense line 34 and the pilot valve (as hereinafter described), applying system pressure to the dome, whereby the dome pressure and the spring 32 apply sufficient force to the disc 24 to hold it closed on the seat 18 against the system pressure applied directly to the disc. At these pressures the dome is not connected with the pilot exhaust line. If the system pressure exceeds the set value, the pilot valve opens a connection between the dome and the pilot exhaust line, thereby reducing dome pressure and allowing the relief disc 24 to lift from the seat 18, exhausting system fluid to the outlet 22. In these respects, the present invention operates in a manner similar to conventional pilot operated relief valves. However, in other respects including the manner in which the foregoing operations are performed, the construction and operation of the pilot valve are substantially different from conventional pilot valves, as will be further evident from the following description.

Figure 1:
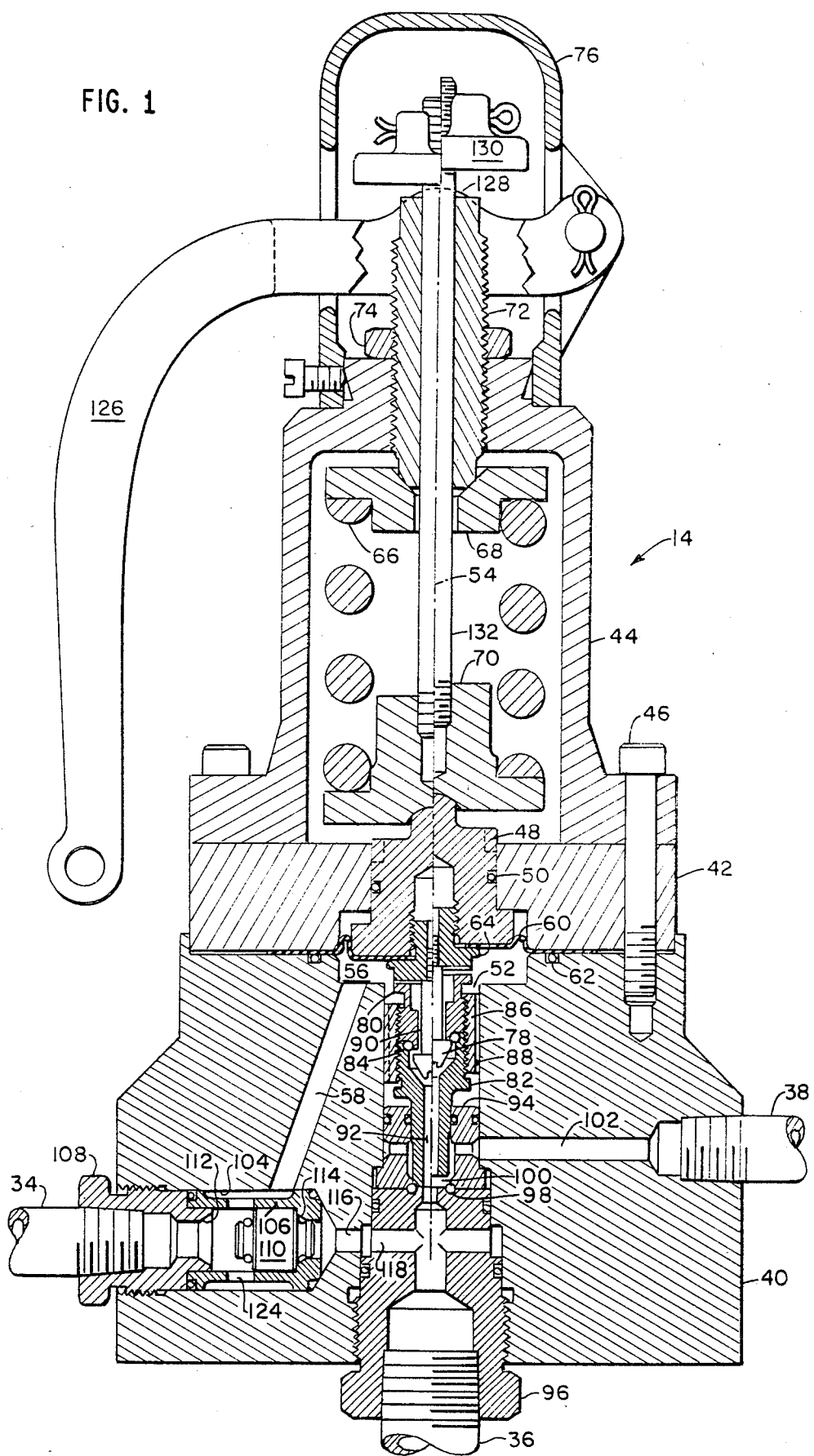
FIG. 1 is a composite elevation in section of the presently preferred embodiment of the pilot valve, the elevation to the left of the central axis showing the parts in positions corresponding to a system pressure below the set value, and the elevation to the right of the axis showing the parts in positions corresponding to a system pressure above the set value.

The pilot valve 14 is constructed as shown in FIG. 1. A body member 40 and piston adapter 42 form a pilot valve body, and are secured together with a bonnet 44 by bolts 46. The piston adapter 42 has a bore slidably receiving a piston 48. An O-ring seal 50 is optionally provided on the piston for certain conditions of operation as explained more fully below. The body member 40 has a bore and counterbores forming a channel 52. This channel and the bore in the piston adapter 42 have a common axis 54.

The body member 40 has a recess forming a chamber 56 communicating by an integral inlet passage 58 with the sense line 34. If the O-ring seal 50 is not used, a diaphragm 60 of suitable flexible material is clamped between the members 40 and 42 with an O-ring seal 62 by the bolts 46. The diaphragm is also clamped to the piston 48 by a diaphragm nut 64 threaded into the piston 48. Thus the system pressure is continually present in the chamber 56 and is applied to the effective area of the piston 48 in a direction to move it upwardly as viewed in the drawing.

Preferably, the diaphragm 60 is omitted and the O-ring seal 50 is used for higher set pressures where it may be desirable to employ the smaller effective area of the O-ring; and the O-ring seal 50 is omitted and the diaphragm 60 is used for lower set pressures where a larger effective area of the piston 48 is to be employed.

A spring 66 compressed between spring washers 68 and 70 applies a force bearing at one end on the piston 48 and at the other end on an adjusting sleeve 72 threaded in the bonnet 44. The sleeve 72 has a locknut 74 and is preferably enclosed by a removable cap 76.

An inlet disc member 78 is threaded into the diaphragm nut 64. These two parts with the piston 48 comprise a subassembly referred to herein as the control stem.

A sleeve subassembly is slidably received in the channel 52 and comprises an inlet seat 80, an inlet seat retainer 82 which retains an O-ring seat 84 against the seat 80, and an inlet valve connector 86 into which the parts 80 and 82 are threaded. The inlet valve connector has one or more axially extending flats 88 permitting the passage of fluid from the chamber 56. The inlet valve seat 80 has an internal flow passage 90 formed by a clearance around the inlet disc member 78, this passage communicating with the chamber 56 through one or more clearances formed by a groove or grooves in the surface of the diaphragm nut 64 facing the inlet seat 80. The passage 90 communicates through the O-ring seat 84 and a passage 92 to the dome line 36.

An exhaust seat retainer 94 is received into the channel 52 against an annular shoulder formed by a counterbore therein. The retainer 94 is held in place by an exhaust seat 96 threaded into the body member 40. An O-ring seat member 98 is retained between the parts 94 and 96. One end of the inlet seat retainer 82 forms an exhaust valve disc cooperating with the seat 98. Annular static O-ring seals are received in grooves on the part 94 to isolate a space 100 around the end of the inlet seat retainer 82 from the channel 52. This space communicates through an internal pilot exhaust passage 102 in the body member 40 to the pilot exhaust line 38.

It will be evident from the foregoing description that there are only two moving elements within the channel 52. These comprise, on the one hand, the control stem subassembly comprising the piston 48 with the attached diaphragm nut 64 and inlet disc 78, and on the other hand, the sleeve subassembly comprising the inlet seat 80 and inlet seat retainer 82 held together by the inlet valve connector 86. The sleeve subassembly forms at one end the exhaust valve disc as well as an inlet seat cooperating with the inlet valve disc on the part 78. The sleeve subassembly is free to slide in the channel 52, and acts as a mechanical stop limiting the downward movement of the diaphragm nut 64 when the exhaust valve is seated. The dimensions of the parts are such that when the exhaust valve is seated and the diaphragm nut abuts the inlet seat 80, the inlet valve disc 78 is spaced from the inlet seat 84, as shown on the portion of FIG. 1 to the left of the axis 54. This corresponds to the condition in which the system pressure is below the set valve determined by the compressive force of the spring 66 as controlled by the adjustment of the sleeve 72. Under these conditions system pressure communicates through the sense line 34, the passage 58, the chamber 56, the flow passage 90 and the dome line 36 with the dome 30, causing the relief valve disc 24 to be seated.

In operation, as the system pressure increases it increases the pressure within the chamber 56. At a predetermined pressure slightly below the set value the chamber pressure applies a force to the piston 48 equal to that of the spring 66. A further increase in chamber pressure causes the piston to move upwardly as viewed in the drawing and the inlet valve disc approaches the inlet seat 84. The inlet valve disc is seated when the chamber pressure reaches a predetermined pressure also slightly below the set value. The seating of the inlet valve disc isolates the chamber 56 from the dome 30.

It will be observed that during the above-described movement of the piston 48 and prior to the chamber pressure reaching the set value, the sleeve subassembly is not restrained by the control stem subassembly. However, the sleeve subassembly continues to hold the exhaust valve disc against the exhaust seat by reason of the fact that the effective area of this subassembly subjected to the chamber pressure is greater than its effective area subjected to the dome pressure.

If the chamber pressure rises above the set value, the control stem begins to lift the sleeve subassembly, lifting the exhaust valve from its seat and allowing the dome pressure to begin to be exhausted through the space 100 and passage 102 to the pilot exhaust line 38. The rate at which the dome pressure is exhausted depends upon the distance by which the exhaust valve disc is lifted from its seat, which in turn depends upon the axial displacement of the piston 48. The portion of FIG. 1 to the right of the axis 54 illustrates the maximum displacement of the piston 48. The displacement of the piston 48 is a function of the system pressure present in the chamber 56 applied against the effective area of the piston, plus the dome pressure applied against the effective area of the exhaust valve disc. Since the effective area of the piston is substantially larger than the effective area of the exhaust valve disc the displacement of the piston 48 is a function mainly of the system pressure. The pressure against the exhaust valve disc functions to apply a small negative feedback to the system. That is, when the exhaust valve disc has lifted the dome pressure applied against it is reduced. This regulates the gain of the pilot valve and ensures the stability of the system.

For the foregoing reasons the pilot valve has a modulating action, as opposed to a snap action. Thus if the system pressure rises only slightly above the set value the exhaust valve rises only slightly from its seat and the dome pressure is gradually relieved to allow the relief valve disc 24 to rise only a short distance from its seat, and the system pressure is relieved at a relatively slower rate until it is again lowered to the set value at which the exhaust valve is reseated. Thus the relief valve passes only that quantity of system fluid which is required to relieve the overpressure condition. On the other hand, if the system pressure rises to a value that is substantially greater than the set value, the exhaust valve disc rises further from its seat, the dome pressure is more quickly exhausted and the relief valve disc 24 is permitted to rise further from its seat, exhausting system fluid more rapidly until the system pressure again reaches the set value.

It will be observed that at system pressures below the set value, once the dome pressure has become equal to the system pressure by reason of fluid flow through the passage 90, fluid flow through the pilot valve ceases. Also, whenever the system pressure exceeds the set value the inlet valve disc is seated to prevent any flow of fluid through the pilot valve. Thus the pilot valve of this invention is of the non-flowing type.

The pilot valve of this invention is conveniently adapted for the inclusion of field test means. For this purpose the body member 40 has a bore 104 connected with the passage 58 and receiving a spacing cylinder 106 which is held in place by a nut 108 threaded in the body. A piston 110 is slidable in the cylinder 106. One end of the piston carries an O-ring closable on a seat 112 to isolate the sense line 34 from the chamber 56. The other end of the piston carries an O-ring closable on a seat 114 connected with an internal passage 116 connecting to the dome through a lateral passage 118 in the exhaust seat 96. Referring to FIG. 2, a source of test fluid under pressure is symbolically shown at 120, connected through a valve 122 to the dome line 36. The source 120 has sufficient pressure whereby upon opening the valve 122 a pressure slightly above the set pressure for which the pilot valve is to be tested may be applied to the dome.

In the previous description, it was assumed that the test valve 122 was closed, resulting in the system pressure forcing the piston 110 to seal against the seat 114, enabling the system pressure to be continually applied to the chamber 56 through apertures 124 in the sleeve 106. When it is desired to test the pilot valve, the valve 122 is opened, applying a pressure slightly above the set pressure to the dome and through the passage 116 to the piston 110, causing the latter to seal against the seat 112 and opening a fluid passage from the dome line, through the apertures 124 and the passage 58 to the chamber 56. If the pilot valve is operating correctly at this pressure, the piston 48 will move sufficiently to lift the exhaust valve from its seat, allowing the dome pressure to be exhausted through the pilot exhaust line 38. This exhaust may be visually observed, but is not sustained because the source 120 is of limited capacity. The test is completed by shutting off the valve 122.

A means for manually testing the pilot valve may also be provided. For this purpose a curved handle 126 is pivoted on the cap 76 and has a cam surface 128 bearing on a nut 130 fastened by a cotter pin to a stem 132. The stem extends freely through the adjusting sleeve 72 and is threaded into the washer 70. During normal operation, the cam surface 128 does not engage the nut 130 and the nut moves up and down with the translation of the piston 48 without affecting the operation of the pilot valve. When it is desired to test the operation of the pilot valve, the handle 126 is lifted, causing the cam surface 128 to bear on the nut 130 and relieving the force of the washer 70 on the end of the piston 48. The piston therefore rises as a result of the system pressure, lifting the exhaust valve from its seat and causing fluid discharge through the pilot exhaust line. Unlike the pressurized test previously described, this test is carried out with the pilot valve subjected to the system pressure that exists at the time of testing, typically below the set value.

It will be apparent that the structures of the pilot and relief valves may be altered or adapted to accommodate a variety of operating conditions, and that the parts may have various configurations and dimensions, as will be apparent to one skilled in this art, without departure from the teachings of this invention.

I claim:

1. A pilot operated pressure relief valve system having, in combination, a relief valve having a seat communicating between an inlet and an outlet, a relief valve disc closable on the seat, a dome adapted to cause a pressure therein to apply a closing force to the valve disc, a pilot valve body forming a channel, portions of the channel respectively forming a chamber and an exhaust seat respectively communicating with the inlet and the dome, said body having an exhaust passage communicating with the dome through the exhaust seat, a sleeve movable in the channel and having an exhaust valve disc closable on the exhaust seat and a flow passage extending through an inlet seat and the exhaust valve disc, the flow passage having one end in communication with the chamber and the other end in communication with the dome, a control stem having a first portion forming a wall of the chamber movable axially of the channel in response to pressure changes in the chamber and a second portion forming an inlet valve disc closable on the inlet seat in the direction away from the exhaust seat, and means for applying a predetermined force to the control stem in opposition to the pressure force in the chamber.

2. A system according to claim 1, in which the effective area of the sleeve in communication with the chamber is greater than its effective area in communication with the dome.

3. A system according to claim 1, in which the dimensions of the sleeve and control stem axially of the channel are such that at an inlet pressure below a predetermined set value the exhaust valve seat is closed and the control stem bears on the sleeve with the inlet valve disc spaced from the inlet seat.

4. A system according to claim 1, in which the channel defines an axis and the sleeve and control stem are supported for coaxial movement therein.

5. A system according to claim 1, in which the exhaust valve disc is slidingly sealed to the channel to isolate the exhaust passage from inlet pressure while the inlet valve disc is seated.

6. A system according to claim 1, in which the effective area of said first portion is substantially greater than the effective area of the exhaust valve disc.

* * * * *